(12) United States Patent
Fox et al.

(10) Patent No.: US 6,532,009 B1
(45) Date of Patent: Mar. 11, 2003

(54) PROGRAMMABLE HARDWIRED GEOMETRY PIPELINE

(75) Inventors: Thomas Winters Fox, Georgetown, TX (US); Mark Ernest Van Nostrand, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,184

(22) Filed: May 18, 2000

(51) Int. Cl.[7] .................................................. G06T 15/00
(52) U.S. Cl. .......................................................... 345/419
(58) Field of Search ................................. 345/418, 419, 345/420, 619, 620

(56) References Cited

U.S. PATENT DOCUMENTS 6,014,472 A * 1/2000 Minami et al. ............. 345/426

OTHER PUBLICATIONS the OpenGL Graphics System: A Specification (Version 1.2); Segal et al.; Mar. 23, 1998.

* cited by examiner

*Primary Examiner*—Phu K. Nguyen
(74) *Attorney, Agent, or Firm*—Duke W. Yee; Mark E. McBurney

(57) ABSTRACT

A graphics pipeline receives graphics data at an input. Processed graphics data is transmitted at an output of the graphics pipeline. A plurality of stages are present in the graphics pipeline. A first stage within the plurality of stages is connected to the input and a last stage within the plurality of stages is connected to the output. A selected stage within the plurality of stages includes a plurality of modes of operation including a first mode of operation, responsive to receiving a first signal in which the selected stage is enabled to process graphics data received by the stage. A second mode of operation occurs in response to receiving a second signal, the selected stage is disabled and data received from a prior stage within the plurality of stages is passed through to a subsequent stage within the plurality of stages.

30 Claims, 8 Drawing Sheets

FIG. 5

| FRAGMENT | AS USED IN GEOMETRY | AS USED IN RASTER |
|---|---|---|
| x, y, z, w | PRIMARY COORDINATE[1] | SCREEN COORDINATE |
| xAux, yAux, zAux, wAux | EYE COORDINATE[2] | n/a |
| s, t, r, q | TEXTURE COORDINATE | TEXTURE COORDINATE |
| fog | FOG FACTOR | FOG FACTOR |
| $f_{ad}$, $f_s$ | n/a | FRONT AMBIENT/DIFFUSE COLOR, FRONT SPECULAR COLOR |
| $b_{ad}$, $b_s$ | n/a | BACK AMBIENT/DIFFUSE COLOR, BACK SPECULAR COLOR |
| $cc_a$, $cc_r$, $cc_g$, $cc_b$ | CURRENT COLOR (ALPHA, RED, GREEN, BLUE) | n/a |
| $n_x$, $n_y$, $n_z$ | NORMAL VECTOR | n/a |
| PScc | SECONDARY CURRENT COLOR (PACKED ALPHA, RED, GREEN, BLUE) | n/a |
| $i_x$, $i_y$, $i_z$ | NORMALIZED EYE COORDINATE[3] | n/a |

FIG. 6

| STAGE | FRAGMENTS AFFECTED | ASSOCIATED COMMAND |
|---|---|---|
| NORMAL/MODEL VIEW TRANSFORMATION | xAux, yAux, zAux, wAux $n_x$, $n_y$, $n_z$ | ENABLE_NORMALXF ENABLE_MDLVWXF |
| NORMALIZATION | $n_x$, $n_y$, $n_z$ $i_x$, $i_y$, $i_z$ | ENABLE_NORMALIZEN ENABLE_TCGSPHERE |
| TEXTURE COORDINATE GENERATION | s, t, r, q | ENABLE_TCG |
| LIGHTING | $f_{ad}$, $f_s$, $b_{ad}$, $b_s$ | |
| TEXTURE/PROJECTION TRANSFORMATION | x, y, z, w s, t, r, q | ENABLE_TEXTUREXF ENABLE_PROJECTXF |
| CLIPPING | all | ENABLE_CLIPPING |
| FOG FACTOR GENERATION | fog | ENABLE_FOG |
| PERSPECTIVE DIVISION | x, y, z s, t, r, q | ENABLE_PERSDIV ENABLE_TEXPERSDIV |
| VIEWPORT TRANSFORMATION | x, y, z | ENABLE_VIEWPORTXF |

FIG. 7

| STAGE | FRAGMENTS REQUIRED |
|---|---|
| NORMAL/MODEL VIEW TRANSFORMATION | $x, y, z, w, n_x, n_y, n_z$ |
| NORMALIZATION | $xAux, yAux, zAux, wAux, n_x, n_y, n_z$ |
| TEXTURE COORDINATE GENERATION | $x, y, z, w, xAux, yAux, zAux, wAux, i_x, i_y, i_z$ |
| LIGHTING | $n_x, n_y, n_z, cc_a, cc_r, cc_g, cc_b, PScc, f_{ad}, f_s, b_{ad}, b_s$ |
| TEXTURE/PROJECTION TRANSFORMATION | $xAux, yAux, zAux, wAux, s, t, r, q$ |
| CLIPPING | all |
| FOG FACTOR GENERATION | $zAux$ |
| PERSPECTIVE DIVISION | $x, y, z, w, s, t, r, q$ |
| VIEWPORT TRANSFORMATION | $x, y, z$ |

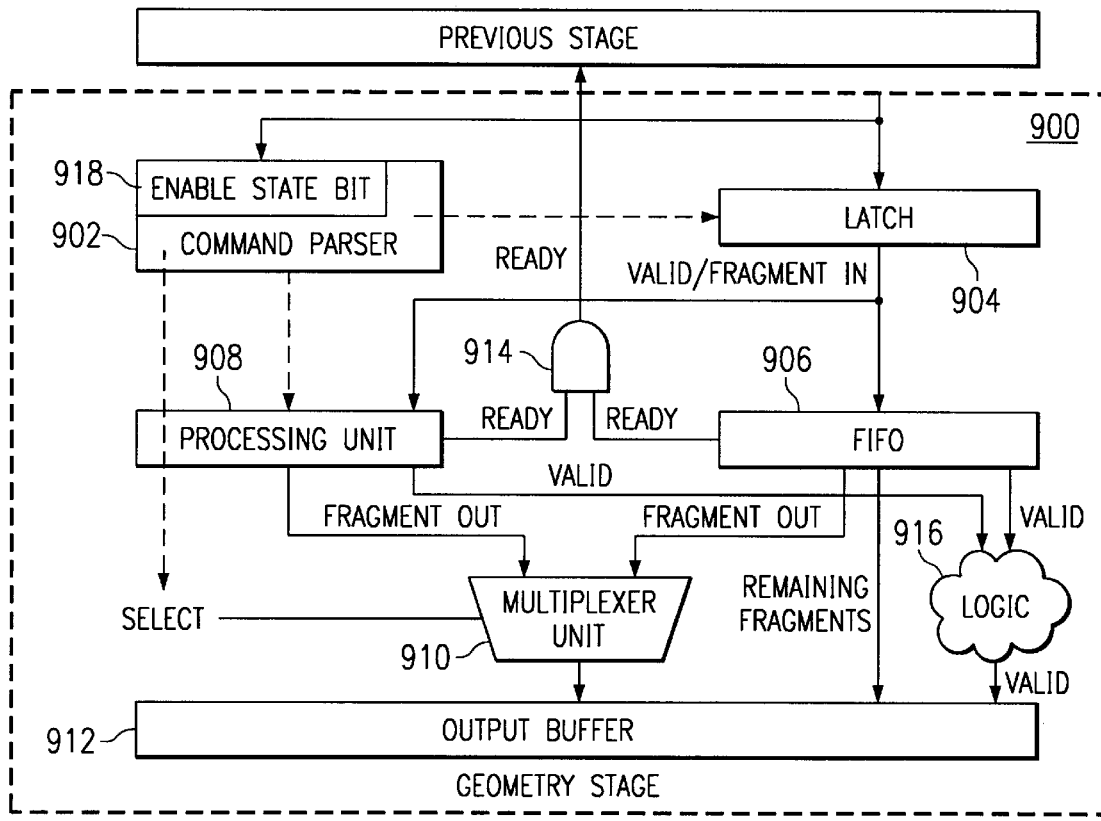

FIG. 9

| SIGNAL | NO TRANSFER | NO TRANSFER | COMMAND | DATA | VERTEX |
|---|---|---|---|---|---|
| VALID | 0 | x | 1 | 1 | 1 |
| READY | x | 0 | 1 | 1 | 1 |
| cmdBit | x | x | 1 | 0 | x |
| cdSelect1 | x | x | 1 | 1 | 0 |

FIG. 8 turn off outgoing PackedPrimaryCC e-bit
turn off outgoing UnpackedPrimaryccA e-bit
turn off outgoing UnpackedPrimaryccR e-bit
turn off outgoing UnpackedPrimaryccG e-bit
turn off outgoing UnpackedPrimaryccB e-bit
turn off outgoing Normal X e-bit
turn off outgoing Normal Y e-bit
turn off outgoing Normal Z e-bit
turn off outgoing PackedSecondaryCC e-bit if (lighting in enabled)

-turn on outgoing Fad e-bit

-Ignore secondaryCurrentColor data,
   regardless of incoming secondaryCurrentColor e-bit -Ignore enable_colorSum bit -if (colorMaterial is enabled)
         regardless of incoming primaryCurrentColor e-bit,
         update appropriate materials, using
   primaryCurrentColor data,
         based on colorMaterial_mode,
         and then throw away primaryCurrentColor data
   else
         Ignore primaryCurrentColor data,
         regardless of incoming primaryCurrentColor e-bit
   end if

FIG. 10A

1004 {
- if (incoming Fad e-bit is on)
　　Add incoming Fad data to
frontAmbientDiffuseEmission quantity
　　that hardware lighting calculates
end if
- if (incoming Fs e-bit is on)
　　Add incoming Fs data to frontSpecular quantity
　　that hardware lighting calculates
end if
- if (incoming Bad e-bit is on)
　　Add incoming Bad data to
backAmbientDiffuseEmission quantity
　　that hardware lighting calculates
end if
- if (incoming Bs e-bit is on)
　　Add incoming Bs data to backSpecular quantity
　　that hardware lighting calculates
end if

1000

- case (ces = 0, tbs = 0)
　　turn off outgoing Fs e-bit
　　turn off outgoing Bad e-bit
　　turn off outgoing Bs e-bit
case (ces = 0, tbs = 1)
　　turn off outgoing Fs e-bit
　　turn on outgoing Bad e-bit
　　turn off outgoing Bs e-bit
case (ces = 1, tbs = 0)
　　turn on outgoing Fs e-bit
　　turn off outgoing Bad e-bit
　　turn off outgoing Bs e-bit
case (ces = 1, tbs = 1)
　　turn on outgoing Fs e-bit
　　turn on outgoing Bad e-bit
　　turn on outgoing Bs e-bit

*FIG. 10B*

```
      ⎡ else                                              1000
      ⎢                                                   ↙
      ⎢     if (incoming Fad e-bit is on)
      ⎢        outgoing Fad e-bit is turned on
      ⎢        outgoing Fad data = incoming Fad data
      ⎢     else
      ⎢        if (incoming current color e-bits are on)
      ⎢           outgoing Fad e-bit is turned on
      ⎢        else
      ⎢           outgoing Fad e-bit is turned off
      ⎢        end if
      ⎢        outgoing Fad data = packed primaryCurrentColor
      ⎢     end if
1006 ⎨
      ⎢     if (incoming Fs e-bit is on)
      ⎢        outgoing Fs e-bit is turned on
      ⎢        outgoing Fs data = incoming Fs data
      ⎢     else
      ⎢        if (enable_colorSum is on)
      ⎢           outgoing Fs e-bit is turned on
      ⎢           outgoing Fs data = secondaryCurrentColor (which is already
      ⎢              packed)
      ⎢        else
      ⎢           outgoing Fs e-bit is turned off
      ⎢           outgoing Fs data is, therefore, irrelevant
      ⎢        end if
      ⎣ end if outgoing Bad e-bit = incoming Bad e-bit
       outgoing Bad data = incoming Bad data outgoing Bs e-bit = incoming Bs e-bit
       outgoing Bs data = incoming Bs data end if
```

FIG. 10C

PROGRAMMABLE HARDWIRED GEOMETRY PIPELINE

BACKGROUND OF THE INVENTION

1. Technical Field

The present invention relates generally to an improved data processing system and in particular to a method and apparatus for processing graphics data. Still more particularly, the present invention provides a method and apparatus to program a geometry engine in a data processing system.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, a triangle, a polygon, or a quadralateral. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

With the large amounts of data and computations involved in processing graphics data, especially with three-dimensional applications, many of these computations have been offloaded from the central processing units to a graphics adapter. These geometry calculations have been accelerated by using a multiprocessor system or a hardwired geometry engine in the graphics adapter. Multiprocessing allows flexibility to implement future processes or algorithms, but is difficult to program and adds to the cost and time needed to develop a graphics adapter. On the other hand, hardwired geometry engines are very straight forward to program, but leave little or no flexibility in implementing future processes or algorithms.

Therefore, it would be advantageous to have an improved hardwire geometry engine, which allows for flexibility in implementing future processes or algorithms.

SUMMARY OF THE INVENTION

The present invention provides a graphics pipeline which receives graphics data at an input. Processed graphics data is transmitted at an output of the graphics pipeline. A plurality of stages are present in the graphics pipeline. A first stage within the plurality of stages is connected to the input and a last stage within the plurality of stages is connected to the output. A selected stage within the plurality of stages includes a plurality of modes of operation including a first mode of operation, responsive to receiving a first signal in which the selected stage is enabled to process graphics data received by the stage. A second mode of operation occurs in response to receiving a second signal, the selected stage is disabled and data received from a prior stage within the plurality of stages is passed through to a subsequent stage within the plurality of stages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating vertex fragment descriptions in accordance with a preferred embodiment of the present invention;

FIG. 6 is a table illustrating fragments affected in a particular stage in accordance with a preferred embodiment of the present invention;

FIG. 7 is a table illustrating fragments required in a particular stage in accordance with a preferred embodiment of the present invention;

FIG. 8 is a table illustrating signals used to transfer data between stages in accordance with a preferred embodiment of the present invention;

FIG. 9 is a block diagram of a geometry stage in accordance with a preferred embodiment of the present invention; and FIGS. 10A–10C are diagrams illustrating psuedo code used in a lighting stage to combine outgoing color based on fragments sent to the lighting unit and its internal states in accordance with a preferred embodiment of the present invention.

DETAILED DESCRIPTION OF THE PREFERRED EMBODIMENT

Figure 1:
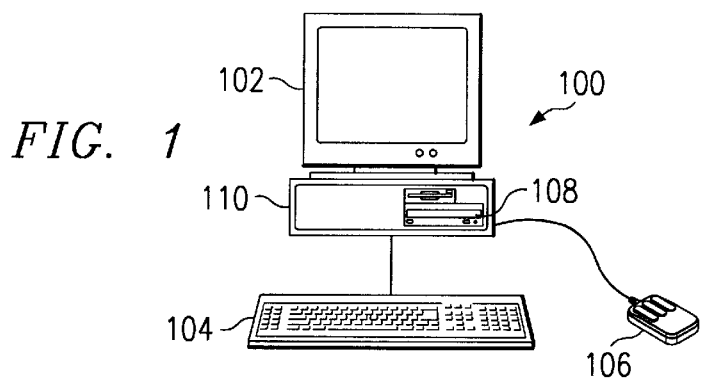
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
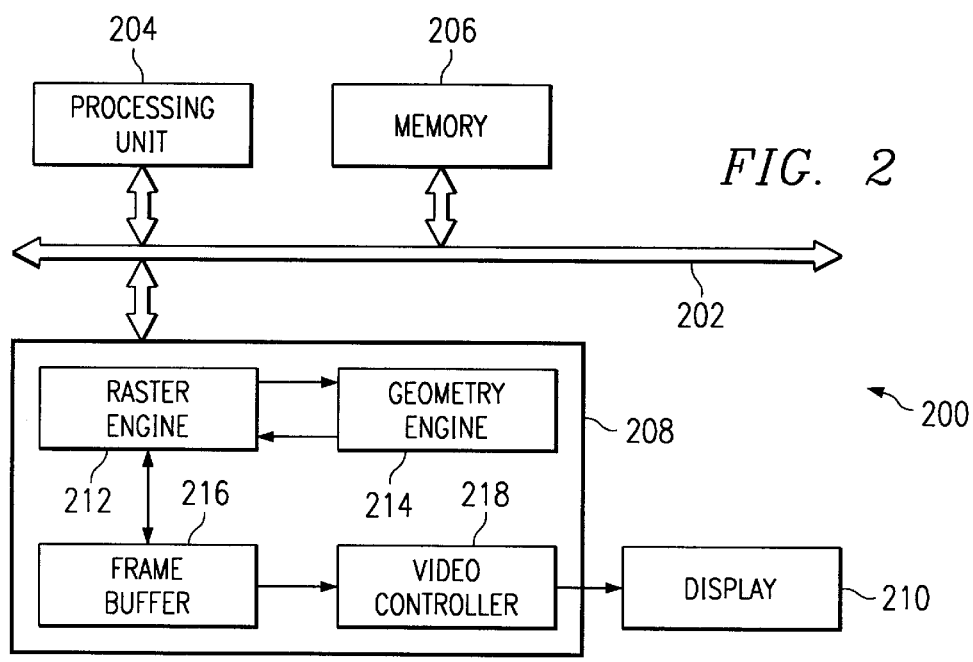
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bit map image while it is "painted" on a screen. Video controller 218 takes the data in frame buffer 216 and generates a display on display 210. Typically, video controller 218 will cycle through frame buffer 216 one scan line at a time.

Figure 3:
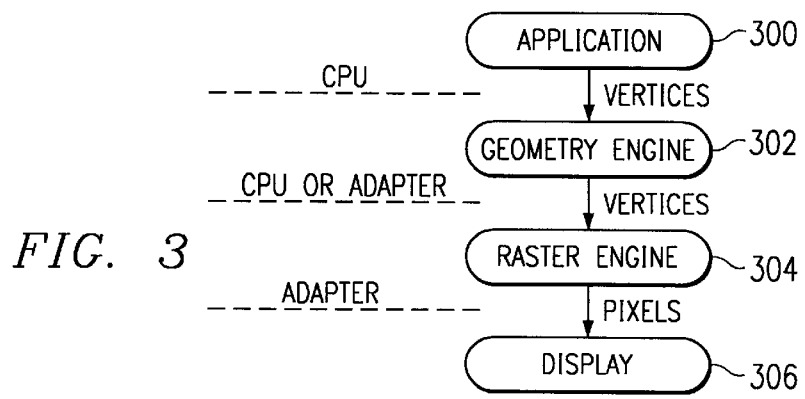
FIG. 3 is a diagram illustrating processing graphics data in accordance with a preferred embodiment of the present invention.

Turning now to FIG. 3, a diagram illustrating processing of graphics data is depicted in accordance with a preferred embodiment of the present invention. Processing of graphics data can be divided into three stages. In the first stage, application 300 generates graphics data for display. The stages always run on the main central processing unit of the computer, such as, for example, processing unit 204 in FIG. 2. The data generated is used to represent an object as a series of points or vertices that are connected in a predetermined fashion based on the type of primitive application 300 is currently rendering. The second stage involves geometry engine 302, which is responsible for transforming incoming vertices received from application 300 into a form for viewing on a display. Typically, along with the transforming vertices, geometry engine 302 is responsible for generating color contributions from lighting sources, generating fog factors that allow an object to become less visible based on the distance from the viewer, and clipping a scene to a given view volume. Geometry engine 302 may be implemented either in a central processing unit or an adapter. In these examples, geometry engine 302 is implemented as geometry engine 214 and graphics adapter 208 in FIG. 2. The third stage, raster engine 304, takes the vertices that have been transformed into screen coordinates and interpolates the colors or maps an image between the vertices to turn a vertex representation of an object into a solid object. In this example, raster engine 304 may be implemented as raster unit 212 in graphics adapter 208 in FIG. 2. This information is then sent to display 306. In the depicted examples, geometry engine 302 is a hardwired geometry engine as opposed to a multi-processor engine.

The mechanism of the present invention provides an ability to use a hardwired geometry engine to provide different ways to calculate effects without requiring coding as used in multi-processor geometry engines. The mechanism of the present invention allows different stages within the geometry engine to be selectively turned on and off. The mechanism of the present invention provides for an ability to selectively process graphics data in different stages. This mechanism also allows for specific effects to be calculated by the stages or to use effects calculated elsewhere. For example, these effects may be calculated by a processing unit, such as processing unit 204 in FIG. 2 or by another processing unit located elsewhere in the data processing system. Further, the effects generated by the processing unit may be combined with those calculated in a stage. These effects include, for example, lighting, fog, and texture coordinate generation.

Figure 4A:
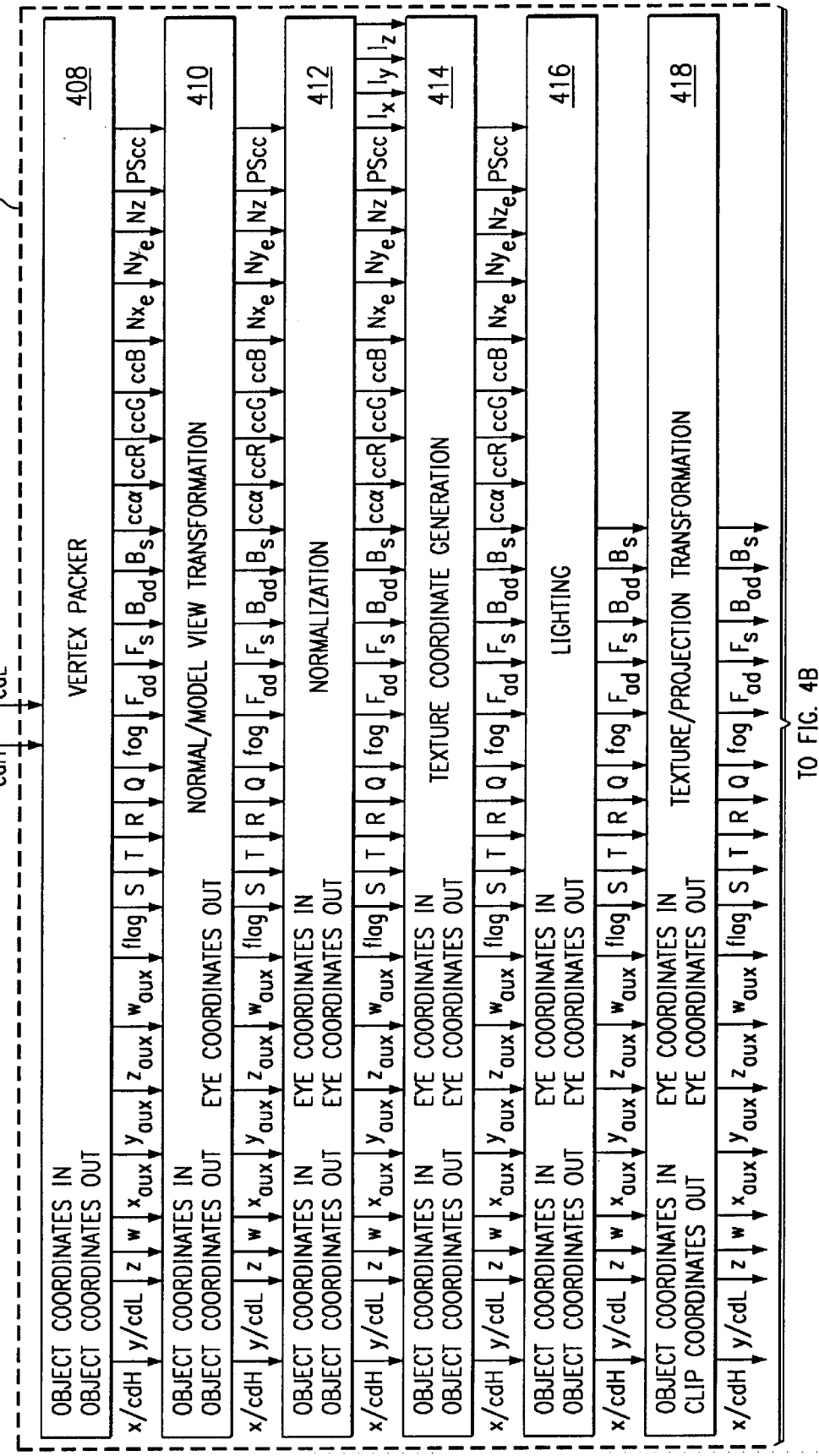
FIGS. 4A and 4B, depicts a block diagram of a geometry engine in accordance with a preferred embodiment of the present invention.
Figure 4B:
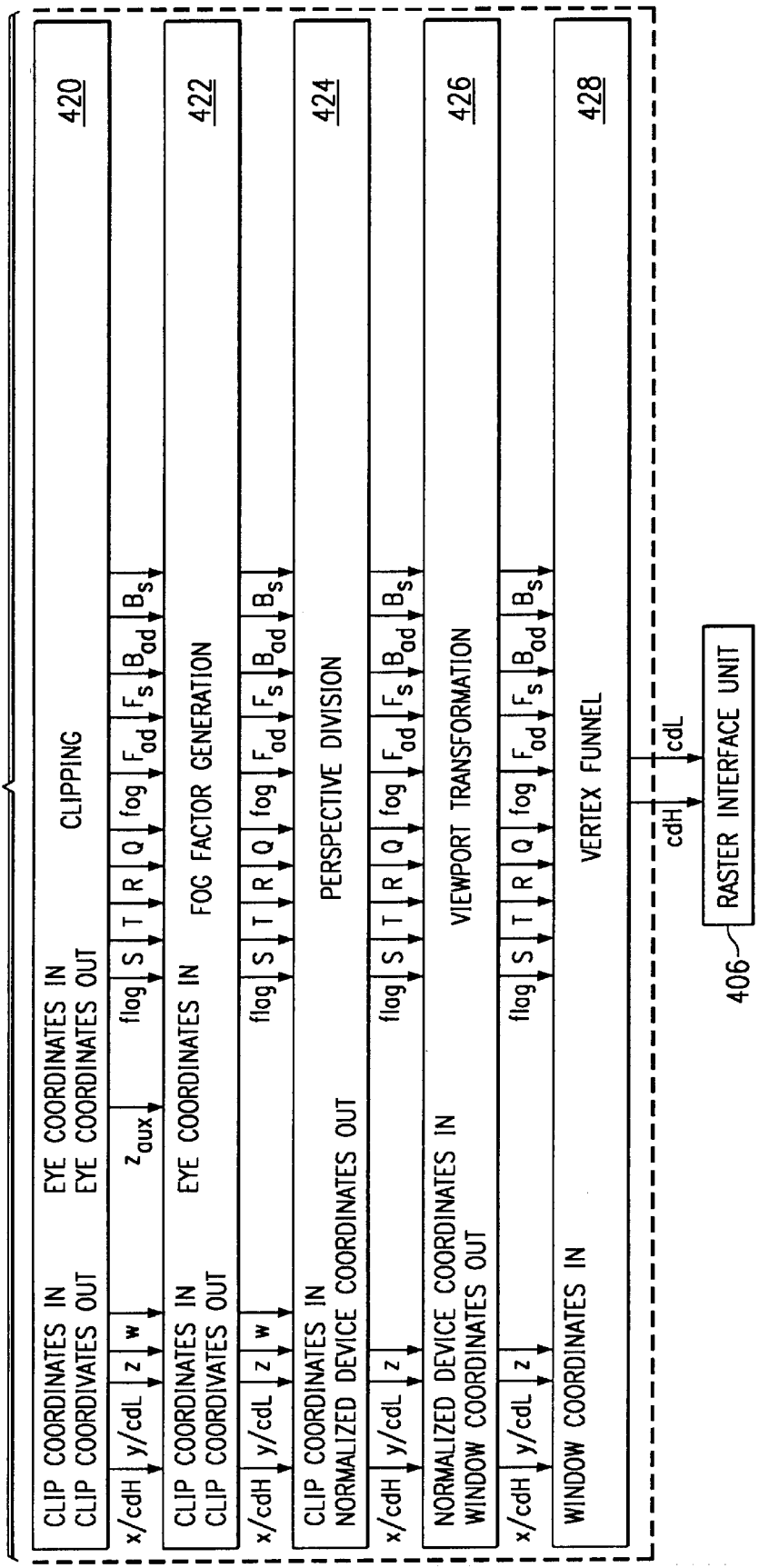

Turning now to FIGS. 4A and 4B, a block diagram of a geometry engine is depicted in accordance with a preferred embodiment of the present invention. Geometry engine 400 illustrates stages or processing elements, which may be implemented in a geometry engine, such as geometry engine 214 in FIG. 2. Geometry engine 400, in this example, includes a geometry unit 402, a raster interface unit 404, and a raster interface unit 406. Data is received by raster interface unit 404 for processing within geometry unit 402. The data is received from a raster engine such as raster engine 210 in FIG. 2. Processed data is returned to the raster engine using raster interface unit 406. The mechanism of the present invention is implemented within the processing elements in geometry unit 402. Specifically, the processing elements implement equations in hardware to process graphics data. The mechanism of the present invention reduces the complexity of the hardware by optimizing the equations in a simpler form and implementing these simplified equations in the processing elements.

Geometry unit 402, in this example, is a graphics pipeline containing a set of processing elements, which include a vertex packer unit 408, a normal/model view transformation unit 410, a normalize unit 412, a texture coordinate generation unit 414, a lighting unit 416, a texture/projection transformation unit 418, a clipping unit 420, a fog factor generation unit 422, a perspective divide unit 424, a viewport transformation unit 426, and a vertex funnel unit 428. These processing elements also are referred to as "stages".

Vertex packer unit 408 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 410 is used to transform a normal vector from object space into eye space. The transformation is dependent on the model view transformation, which is an inverse transpose of the model view matrix. The model view transformation in normal/model view transformation unit 410 transforms object coordinates into eye coordinates by translating, scaling, and rotating objects.

Normalize unit 412 changes the normal vector to a vector of unit length, having a magnitude of 1.0, while preserving the direction of the original vector. Texture coordinate generation unit 414 generates texture coordinates used for displaying texture for a primitive. Texture coordinate generation unit 414 generates texture coordinates, such as object linear, eye linear, and spherical.

Lighting unit 416 computes shading and colors for each vertex. Specifically, lighting unit 416 generates the color of each vertex of an object based on the orientation of the object, the material properties of the object, the properties of the scene, and any defined light sources. Texture/projection transformation unit 418 transforms texture coordinates by translating, scaling, and rotating objects. Additionally, texture/projection transformation unit 418 transforms eye coordinates into clip coordinates, moving objects into a "viewing volume", by translating, scaling, and rotating objects. Typically this volume is a cube with extents of ±w that is orthogonal to the xyz coordinate system. Prospective projection makes an object further away appear smaller, while orthogonal projection does not make objects appear smaller when they are further away.

Clipping unit 420 clips objects to a viewing volume. Fog factor generation unit 422 is used to make an object fade into the distance (atmospheric effects) by making objects further away from the viewer less visible.

Perspective divide unit 424 is used to transform clip coordinates to normalize device coordinates [−1, +1] by dividing the fourth coordinate w. Viewpoint transformation unit 426 is used to transform normalized device coordinates into screen or window coordinates. Device coordinates are coordinates used by the adapter to display images. Normalized device coordinates are device coordinates that are normalized to between 0 and 1.

Vertex funnel unit 428 takes fragments of vertices and places them on a bus for use by the raster interface unit. In this example, the fragments are funneled into a 64-bit data word for transfer on the bus.

The fragments and stages illustrated in geometry unit 402 are based on fragments and operations specified in OpenGL, which is defined in The OpenGL Graphics System: A Specification (Version 1.2), which is available from Silicon Graphics, Inc.

In this example, geometry engine 400 received data at vertex packer unit 408 one word at a time. The resulting vertex is sent to the raster engine one word at a time.

Turning now to FIG. 5, a diagram illustrating vertex fragment descriptions is depicted in accordance with a preferred embodiment of the present invention. Table 500 illustrates different fragments, which make up a vertex. Column 502 illustrates fragments and their uses in a geometry engine in column 504 and in a raster engine in column 506. These fragments are assembled in vertex packer 408 in FIG. 4A and contain the information used to describe that particular vertex.

As a vertex travels through a geometry pipeline, such as geometry engine 400, a given fragment, such as those illustrated in FIG. 4A may be updated based on the programming of the stage to affect that particular fragment. When a fragment no longer has meaning to subsequent stages, the fragment ceases to be passed down the pipeline. Each stage or processing element in a geometry pipeline is programmed with a simple enable command to either affect a given vertex fragment or pass that data from the previous stage to its output.

Turning to FIG. 6, a table illustrating fragments affected in a particular stage is depicted in accordance with a preferred embodiment of the present invention. Table 600 illustrates a breakdown of stages, such as those in geometry engine 400 in FIG. 4A, and fragments that may change based on the programming of a particular stage. Table 600 includes a column 602 identifying in different stages. Fragments affected are illustrated in column 604, which identifies different fragments that are affected by commands shown in column 606. These commands are used to enable and disable processing of various fragments in the stages identified in table 600. In particular, the illustrated example below shows selective enabling of a lighting stage as well as an ability to combine fragments $f_{ad}$, $f_s$, $b_{ad}$, and $b_s$ with data generated by the lighting stage.

In FIG. 7, a table illustrating fragments required in a particular stage is depicted in accordance with a preferred embodiment of the present invention. Table 700 illustrates stages in column 702 and the fragments required for each stage in column 704. In this example, the lighting stage generates lighting effects using the following fragments: $n_x$, $n_y$, $n_z$, $cc_a$, $cc_r$, $cc_g$, $cc_b$, and PScc. The fragments $f_{ad}$, $f_s$, $b_{ad}$, and $b_s$ are those received from a source outside of the pipeline, such as an application executing on a host processor. The mechanism of the present invention allows for just selecting the output from the lighting stage or combining that output with the fragments received from the source. Alternatively, the fragments received from the source may be passed through the lighting stage unaffected.

Turning now to FIG. 8, a table illustrating signals used to transfer data between stages is depicted in accordance with a preferred embodiment of the present invention. Data transfer between stages is used to pass two types of data in these examples, command data and vertex data. Two types of commands may be transferred. One is a command data pair containing a word of command and a word of data. Another type of command involves data strands in which a word of command is present and multiple words of data are present.

Table 800 illustrates a set of signals valid, ready, cmdBit, and cdSelect used to transfer data between stages in column 802. Whether a transfer is to occur is illustrated in columns 804 and 806. Applicability of a signal to transfer a command is illustrated in column 808. Applicability of the signal to transfer a word of data is shown in column 810. Applicability in transferring a vertex is shown in column 812. The valid signal indicates whether that there is either a command, data, or vertex that needs to be sent to the subsequent stage. The ready signal indicates whether a stage is ready to transfer data. As can be seen, this signal is applicable to command, data, and vertices. The signal cmdBit indicates that a command is to be transferred over the interface. The signal cdselect is used to indicate whether command data, rather than vertex data is present. These signals take into account that commands as well as x and y coordinates data are sent over the same lines within geometry unit 402 in FIG. 4A.

Turning next to FIG. 9, a block diagram of a geometry stage is depicted in accordance with a preferred embodiment of the present invention. In this example, stage 900 includes a command parser 902, a latch 904, a first-in-first-out (FIFO) 906, a processing unit 908, a multiplexer unit 910, an output buffer 912, AND gate 914, and logic 916. Commands received by stage 900 are parsed within command parser 902. Commands relevant to updating or changing the state of a stage are identified and used within stage 900. Fragments that are required by stage 900 and subsequent stages are sent to both processing unit 908 and FIFO 906. Fragments not required by subsequent stage are sent only to processing unit 908.

In this example, a sequence of events that occur when stage 900 is enabled is described. When an enable command is received by stage 900, the enable command is received by command parser 902. When stage 900 goes into a not busy state, command parser 902 updates enable state bit 918. Stage 900 shifts into a not busy state when processing unit 908 has finished processing any fragments sent to processing unit 908.

Enable state bit 918 controls a number of components within stage 900. Specifically, multiplexer 910 is turned on to send fragments output by either processing unit 908 or FIFO 906 to output buffer 912, depending on whether stage 900 is enabled. Additionally, enable state bit 918 is used to activate and deactivate processing unit 908, which includes a state machine to generate ready and valid signals along with output fragments. Also, logic 916 is activated by enable state bit 918 to monitor for valid signals from processing unit 908 and FIFO 906 to generate a valid signal to output buffer 912.

When stage 900 is enabled, fragments for a vertex are received in latch 904. Additionally, a valid signal, such as the valid signal discussed in FIG. 8, is received by latch 904. The fragments and the valid signal are sent to both processing unit 908 and FIFO 906. Processing unit 908 generates a ready signal when it is able to accept another set of fragments for processing. This ready signal is sent to AND gate 914. These fragments are also referred to as "fragments in". Examples of these types of fragments may be found in FIG. 7.

Processing unit 908 will generate a valid signal each time a set fragments are processed. These processed fragments are also referred to as "fragments out". Examples of fragments out may be found in FIG. 6.

The fragments output from processing unit 908 are sent through multiplexer unit 910 into output buffer 912. The output from FIFO 906 is not selected for transmission to output buffer 912 through multiplexer unit 910 when stage 900 is enabled. Fragments in FIFO 906 not required in stage 900 are sent to output buffer 912. These fragments are also referred to as remaining fragments and are fragments required for subsequent stages that are not affected by the current stage. FIFO 906 also will generate a valid signal when all of the fragments within FIFO 906 have been sent to output buffer 912.

Logic 916 waits until a valid signal is received from both processing unit 908 and FIFO 906 to send a valid signal to output buffer 912. Upon receiving the valid signal, output buffer 912 sends the completed vertex to a subsequent stage.

If stage 900 is disabled, all of the data flows directly from latch 904 into FIFO 906 and finally to output buffer 912. In this case, multiplexer 910 selects fragments out from FIFO 906 instead of processing unit 908 for transmission to output buffer 912. The other fragments, the remaining fragments, are sent to output buffer 912. In this instance, logic 916 only looks for a valid signal from FIFO 906 and not from processing unit 908 in determining when to generate a valid signal to output buffer 912 to send the completed vertex to a subsequent stage in the pipeline for processing.

With this mechanism, an output may be selected from a stage, such as that generated by processing unit 908 in stage 900 or data passed down from the top of the pipeline directly through latch 904, FIFO 906, and into output buffer 912. Additionally, data may be passed through the pipeline to stage 900 for combination with results generated by processing unit 908. For example, lighting effects $f_{ad}$, $f_s$, $b_{ad}$, and $b_s$ are lighting effects calculated by software and sent into the pipeline. In this example, these effects are used in combination with the calculated by the lighting stage. If these effects are not to be combined with those calculated by the lighting stage, these lighting effects are not sent to the pipeline.

Turning now to FIGS. 10A–10C, a diagram illustrating psuedo code used in a lighting stage to combine outgoing color based on fragments sent to the lighting unit and its internal states is depicted in accordance with a preferred embodiment of the present invention. In this example, code 1000 in FIG. 10A determines whether a lighting stage, such as lighting unit 416 in FIG. 4A, is enabled in section 1002. If the lighting stage is enabled, the lighting stage performs lighting calculations and may add front ambient diffusion color ($f_{ad}$), front specular color ($f_s$), back ambient diffuse color ($b_{ad}$), and/or back specular color ($b_s$) to the calculations performed to the lighting unit, depending on which elements are set to be added in section 1004 in FIG. 10B. Alternatively, if the lighting stage is not enabled, front ambient diffusion color ($f_{ad}$), front specular color ($f_s$), back ambient diffuse color ($b_{ad}$), and/or back specular color ($b_s$) may be used as illustrated in section 1006 in FIG. 10C.

Thus, the mechanism of the present invention provides an ability to disable a stage and pass in the data from an outside source. Additionally, the present invention also allows combining data passed in from an outside source for combination with output generated by a particular stage. In this manner, the mechanism of the present invention provides programmability in a hardwired geometry engine. With the mechanism of the present invention, different stages may be enabled and disabled as well as allowing combining data generated from an outside source with results produced by a particular stage. The data generated by the outside source may be from an application executing on a host processor. Alternatively, the data may be generated by an application executing by an application on a processor located on the same graphics adapter as the geometry engine. For example, the data may be generated by a digital signal processor (DSP) located on the graphics adapter with the geometry engine.

In this manner, new processes or algorithms may be implemented in which a current stage may be bypassed until a hardware implementation of the new processes or algorithms can be implemented at a later time. In this manner, adaptation or reconfiguration of a geometry engine may be made quickly through the flexibility provided by the mechanism of the present invention.

The description of the present invention has been presented for purposes of illustration and description, and is not intended to be exhaustive or limited to the invention in the form disclosed. Many modifications and variations will be apparent to those of ordinary skill in the art. For example, the stage described in the illustrations above are those for a lighting stage. The enablement and disablement mechanism as well as the mechanism for combining data from an outside source may be applied to any stage in a geometry engine. Further, although specific stages and processing elements are illustrated in the examples, the mechanism of the present invention may be applied to geometry engines having any number of different types of stages or processing elements. The embodiment was chosen and described in order to best explain the principles of the invention, the practical application, and to enable others of ordinary skill in the art to understand the invention for various embodiments with various modifications as are suited to the particular use contemplated.

What is claimed is:

1. A graphics pipeline comprising:
   an input, wherein the input receives graphics data;
   an output, wherein the output transmits processed graphics data; and
   a plurality of stages, wherein a first stage within the plurality of stages is connected to the input and a last stage within the plurality of stages is connected to the output, wherein a selected stage within the plurality of stages includes a plurality of modes of operation including:
      a first mode of operation, responsive to receiving a first signal, in which the selected stage is enabled to process graphics data received by the selected stage; and
      a second mode of operation, responsive to receiving a second signal, in which the selected stage is disabled and passes through data received from a prior stage within the plurality of stages to a subsequent stage within the plurality of stages without processing the graphics data.

2. The graphics pipeline of claim 1, wherein the selected stage further includes:
   a third mode of operation, responsive to receiving a third signal, in which the selected stage is enabled to process graphics data and alter graphics data input into the selected stage.

3. The graphics pipeline of claim 1, wherein the selected stage is one of a vertex packer unit, a normal/model view transformation unit, a normalize unit, a texture coordinate generation unit, a lighting unit, a texture/projection transformation unit, a clipping unit, a fog factor generation unit, a perspective divide unit, a viewport transformation unit, and a vertex funnel unit.

4. The graphics pipeline of claim 1, wherein the output is connected to a raster engine.

5. The graphics pipeline of claim 4, wherein the selected stage is a vertex funnel unit that places fragments of vertices on a bus for use by the raster engine.

6. The graphics pipeline of claim 1, wherein the selected stage is a vertex packer unit, and wherein the vertex packer unit assembles attribute fields for a vertex in the graphics data.

7. The graphics pipeline of claim 1, wherein the selected stage is a normal/model view transformation unit, and wherein the normal/model view transforms object coordinates of vertices in the graphics data into eye coordinates.

8. The graphics pipeline of claim 1, wherein the selected stage is a normalize unit, and wherein the normalize unit performs normalization of vertices in the graphics data that have been transformed.

9. The graphics pipeline of claim 1, wherein the selected stage is a lighting unit that computes shading and colors for each vertex in the graphics data.

10. The graphics pipeline of claim 1, wherein the selected stage is a clipping unit, and wherein the clipping unit identifies a portion of a graphics primitive in the graphics data that lies within a clip region.

11. The graphics pipeline of claim 1, wherein the selected stage is a fog factor generation unit that generates a fog factor for the graphics data.

12. The graphics pipeline of claim 11, wherein the selected stage is a perspective divide unit that generates normalized device coordinates from input coordinates of vertices in the graphics data obtained from the fog factor generation unit.

13. The graphics pipeline of claim 12, wherein the selected stage is a viewpoint transformation unit that transforms normalized device coordinates, obtained from the perspective divide unit, into window coordinates.

14. The graphics pipeline of claim 1, wherein the graphics data comprises at least one vertex fragment.

15. The graphics pipeline of claim 1, wherein data is transferred between the first stage, last stage and the selected stage using at least one of a valid signal, a ready signal, a cmdBit signal, and a cdSelect signal.

16. A graphics adapter comprising:
   an input configured to receive graphics data;
   a frame buffer, wherein processed graphics data is stored for display;
   a raster engine connected to the input and to the frame buffer, wherein the raster engine rasterizes the processed graphics data for display; and
   a geometry engine connected to the raster engine, wherein the geometry engine receives graphics data from the raster engine, processes the graphics data to form the processed graphics data, and returns the processed graphics data to the raster engine and wherein the geometry engine includes a set of processing elements in which at least one processing element within the set of elements is selectively enabled to process graphics data and passed the graphics data without processing the graphic data when disabled.

17. The graphics adapter of claim 16, wherein the geometry engine processes vertexes and wherein the processing element is selectively enabled to process data for a vertex using graphics data input into the geometry engine in addition to the data for the vertex.

18. The graphics adapter of claim 16, wherein the processing element is disabled and passes graphics data through the processing element.

19. The graphics adapter of claim 16, wherein the at least one processing element is one of a vertex packer unit, a normal/model view transformation unit, a normalize unit, a texture coordinate generation unit, a lighting unit, a texture/projection transformation unit, a clipping unit, a fog factor generation unit, a perspective divide unit, a viewport transformation unit, and a vertex funnel unit.

20. The graphics adapter of claim 19, wherein the at least one processing element is a vertex funnel unit that places fragments of vertices on a bus for use by the raster engine.

21. The graphics adapter of claim 16, wherein the at least one processing element is a vertex packer unit, and wherein the vertex packer unit assembles attribute fields for a vertex in the graphics data.

22. The graphics adapter of claim 16, wherein at least one processing element is a normal/model view transformation unit, and wherein the normal/model view transforms object coordinates of vertices in the graphics data into eye coordinates.

23. The graphics adapter of claim 16, wherein the at least one processing element is a normalize unit, and wherein the normalize unit performs normalization of vertices in the graphics data that have been transformed.

24. The graphics adapter of claim 16, wherein the at least one processing element is a lighting unit that computes shading and colors for each vertex in the graphics data.

25. The graphics adapter of claim 16, wherein the at least one processing element is a clipping unit, and wherein the clipping unit identifies a portion of a graphics primitive in the graphics data that lies within a clip region.

26. The graphics adapter of claim 16, wherein the at least one processing element is a fog factor generation unit that generates a fog factor for the graphics data.

27. The graphics adapter of claim 26, wherein the at least one processing element is a perspective divide unit that generates normalized device coordinates from input coordinates of vertices in the graphics data obtained from the fog factor generation unit.

28. The graphics adapter of claim 27, wherein the at least one processing element is a viewpoint transformation unit that transforms normalized device coordinates, obtained from the perspective divide unit, into window coordinates.

29. The graphics adapter of claim 16, wherein the graphics data comprises at least one vertex fragment.

30. The graphics adapter of claim 16, wherein data is transferred between the set of processing elements using at least one of a valid signal, a ready signal, a cmdBit signal, and a cdSelect signal.

* * * * *